(12) United States Patent
James et al.

(10) Patent No.: US 8,135,072 B2
(45) Date of Patent: Mar. 13, 2012

(54) CAVLC RUN BEFORE ENCODE WITH ZERO CYCLE COSTS

(75) Inventors: Scott F. James, Waterloo (CA); Eric C. Pearson, Conestogo (CA)

(73) Assignee: LSI Corporation, Milpitas, CA (US)

(*) Notice: Subject to any disclaimer, the term of this patent is extended or adjusted under 35 U.S.C. 154(b) by 1020 days.

(21) Appl. No.: 12/058,343

(22) Filed: Mar. 28, 2008

(65) Prior Publication Data

US 2009/0034611 A1    Feb. 5, 2009

Related U.S. Application Data

(60) Provisional application No. 60/963,025, filed on Aug. 1, 2007.

(51) Int. Cl.
*H04N 11/02* (2006.01)
(52) U.S. Cl. .................................. 375/240.23
(58) Field of Classification Search .......... 341/59, 341/65, 67; 375/240, 240.01, 240.23; 382/234, 382/239
See application file for complete search history.

(56) References Cited

U.S. PATENT DOCUMENTS

| | | | | |
|---|---|---|---|---|
| 6,124,811 A * | 9/2000 | Acharya et al. | ................. | 341/63 |
| 6,646,578 B1 * | 11/2003 | Au | .................................. | 341/67 |
| 7,292,163 B1 * | 11/2007 | Fedele | ............................ | 341/67 |
| 7,430,238 B2 * | 9/2008 | Lin et al. | .................. | 375/240.16 |
| 7,501,964 B2 * | 3/2009 | Mittal et al. | .................. | 341/107 |
| 7,830,964 B2 * | 11/2010 | Winger et al. | ............ | 375/240.23 |
| 2005/0135691 A1 * | 6/2005 | Reese | ........................... | 382/246 |
| 2006/0018384 A1 * | 1/2006 | Lee et al. | ................. | 375/240.23 |
| 2009/0034611 A1 * | 2/2009 | James et al. | ............ | 375/240.03 |

* cited by examiner

*Primary Examiner* — Dmitry H Levitan
(74) *Attorney, Agent, or Firm* — Christopher P. Maiorana, PC

(57) ABSTRACT

An apparatus including a control circuit and an encoder circuit. The control circuit may configured to generate a first control signal and a second control signal. The encoder circuit may be configured to (i) receive a plurality of coefficients, the first control signal and the second control signal and (ii) generate an encoded signal in response to the plurality of coefficients, the first control signal and the second control signal. The encoder circuit may be further configured to simultaneously encode run before syntax elements with the plurality of coefficients.

20 Claims, 2 Drawing Sheets

US 8,135,072 B2

CAVLC RUN BEFORE ENCODE WITH ZERO CYCLE COSTS

This application claims the benefit of U.S. Provisional Application No. 60/963,025, filed Aug. 1, 2007 and is hereby incorporated by reference in its entirety.

FIELD OF THE INVENTION

The present invention relates to video encoding generally and, more particularly, to a method and/or apparatus for implementing a context adaptive variable length coding (CAVLC) run before encode with zero cycle costs.

BACKGROUND OF THE INVENTION

H.264 includes a context adaptive variable length coding (CAVLC) encoding method. To maintain a given bitrate, the CAVLC encoding method needs to be performed in as short an amount of time as possible. The CAVLC encoding method includes a "run before" syntax element. The run before syntax element indicates a "run" of zeros "before" a next coefficient, taken from the perspective of traversing a linear array of quantized coefficients (QC) after the quantized coefficients have been forward scanned from the high frequency (AC) end to the low frequency end (DC). In a conventional scenario, the quantized coefficients are produced from a video source and encoded as a residual block using the CAVLC encoding method. In order to calculate the CAVLC encoding for a given run before, the number of zeros left must be known. The number of zeros left is initialized with the total number of zeros, as defined in H.264, and subsequentially decremented by the amount of each run. Both the run and zeros left are used as inputs into a look-up table (LUT), i.e., H.264 Table 9-10, that provides the CAVLC encoding. The conventional scenario sequentially performs the CAVLC encoding in software/hardware (i.e., performing run before encoding following coefficient encoding). The conventional scenario has a disadvantage that the throughput is negatively affected by sequentially performing the encoding.

SUMMARY OF THE INVENTION

The present invention concerns an apparatus including a control circuit and an encoder circuit. The control circuit may configured to generate a first control signal and a second control signal. The encoder circuit may be configured to (i) receive a plurality of coefficients; the first control signal and the second control signal and (ii) generate an encoded signal in response to the plurality of coefficients, the first control signal and the second control signal. The encoder circuit may be further configured to simultaneously encode run before syntax elements with the plurality of coefficients.

The objects, features and advantages of the present invention include providing a method and/or apparatus for implementing a context adaptive variable length coding (CAVLC) run before encode with zero cycle costs that may (i) simultaneously encode coefficients and run before syntax elements, (ii) increase cycle throughput, (iii) perform look-up table operations, zeros left tracking and barrel shifting in parallel, (vi) maintain a given bitrate when the number of zero coefficients interspersed with non-zero coefficients varies and/or (v) increase performance.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
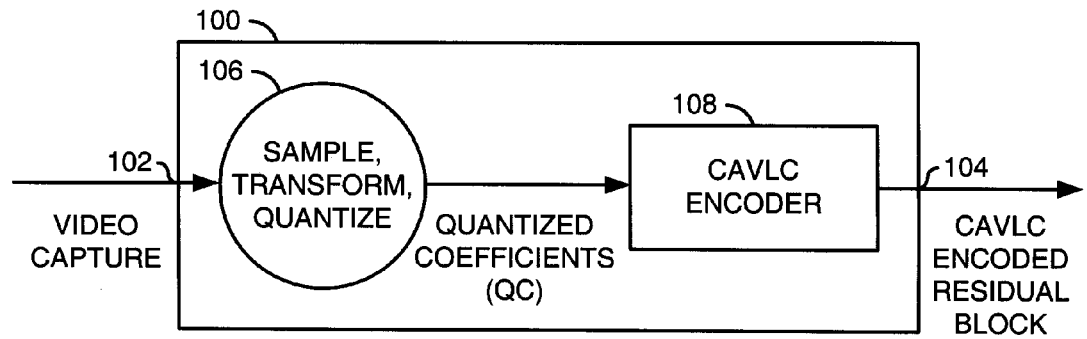
FIG. 1 is a diagram illustrating a video encoder.

Referring to FIG. 1, a block diagram is shown illustrating a video encoder 100 implemented in accordance with the present invention. The video encoder 100 may have an input 102 that may receive a captured video signal and an output 104 that may present a context adaptive variable length coding (CAVLC) encoded residual block. The CAVLC encoded residual block may be part of an encoded (or compressed) bitstream. In one example, the encoder 100 may comprise a block 106 and a block 108. The block 106 may comprise, in one example, a sample, transform and quantization block. The block 106 may be configured to generate blocks of quantized residual coefficients (e.g., residual blocks) in response to a video stream. The block 106 may be implemented using conventional techniques.

The block 108 may be implemented as a context adaptive variable length coding (CAVLC) encoder. The block 108 may implement a method in accordance with the present invention. In one example, the block 108 may be configured to simultaneously encode run before syntax elements with coefficients. Simultaneously encoding the run before syntax elements with the coefficients may increase cycle throughput by, for example, a factor of 2n-1, where n represents the maximum number of coefficients for a given residual block (e.g., 4, 15, 16 for chroma DC, Luma AC/Chroma AC, and Luma/Luma DC, respectively).

The block 106 may have a first input that may receive the captured video signal from the input 102 of the encoder 100 and an output that may present a plurality of quantized coefficients (QC). The quantized coefficients may be generated by sampling, transforming and quantizing the captured video signal. The quantized coefficients may be arranged, in one example, as a two-dimensional (2D) matrix (array) of coefficients. The block 108 may have an input that may receive the quantized coefficients from the block 106 and an output that may present the context adaptive variable length coding (CAVLC) encoded residual block to the output 104 of the encoder 100. In one example, the encoder 100 may be compliant with the "Draft Text of H.264/AVC Fidelity Range Extensions Amendment," Joint Video Team (JVT) of ISO/IEC MPEG8 ITU-TVCEG (ISO/IEC JTC1/SC29/WG12 and ITU-I SG16 Q.6), 12$^{th}$ Meeting: Redmond, Wash, USA 17-23 Jul. 2004, ITU-T Recommendation H.264/ISO/IEC 14496-10.

Figure 2:
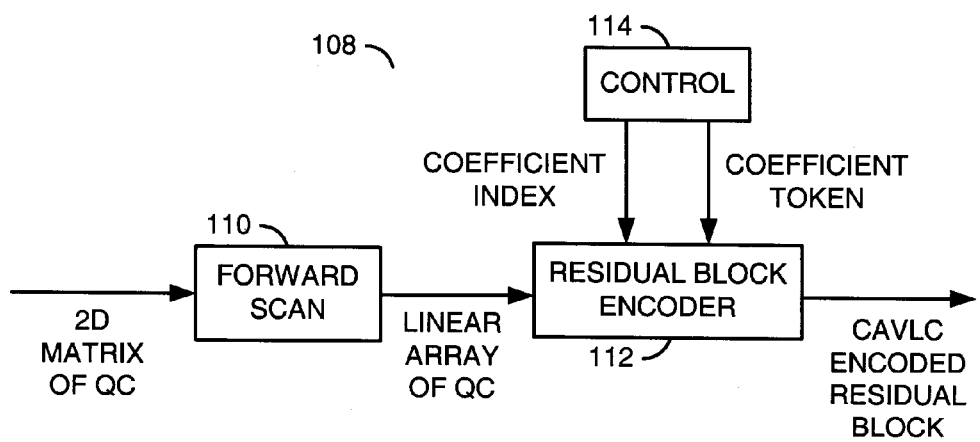
FIG. 2 is a diagram illustrating a CAVLC encoder block.

Referring to FIG. 2, a block diagram is shown illustrating the context adaptive variable length coding (CALVC) encoder 108 of FIG. 1, implemented in accordance with a preferred embodiment of the present invention. In one example, the CALVC encoder 108 may comprise a block (or circuit) 110, a block (or circuit) 112, and a block (or circuit) 114. The block 110 may be implemented as a forward scan block. The block 112 may be implemented as a residual block encoder. The block 114 may be implemented as a control block. In one example, the quantized coefficients may be presented to a first input of the block 110. In one example, the quantized coefficients may be arranged in a two dimensional matrix. The block 110 may be configured to transform the two dimensional matrix of quantized coefficients into a linear array of quantized coefficients. The block 110 may have an output that may present the linear array of quantized coefficients. In one example, the linear array of quantized coefficients may start from the high frequency (AC) coefficients and continuing through to the low frequency (DC) coefficients.

The linear array of quantized coefficients may be presented to a first input of the block 112. The block 112 may have a second input that may receive a signal (e.g., COEFFICIENT INDEX), a third input that may receive a signal (e.g., COEFFICIENT TOKEN), and an output that may present the context adaptive variable length coding (CAVLC) encoded residual block. The block 112 may be configured to generate the CAVLC encoded residual block in response to the linear array of quantized coefficients, the signal COEFFICIENT INDEX and the signal COEFFICIENT TOKEN. The control block 114 may have a first output that may present the signal COEFFICIENT INDEX and a second output that may present the signal COEFFICIENT TOKEN. The block 114 may be configured to generate the signals COEFFICIENT INDEX and COEFFICIENT TOKEN in accordance with, for example, the H.264 standard.

The signals COEFFICIENT INDEX and COEFFICIENT TOKEN may be implemented, in one example, as control signals. The signal COEFFICIENT INDEX may indicate which coefficient in a current residual block is being encoded. The signal COEFFICIENT TOKEN may indicate when a new residual block is present. In one example, the signal COEFFICIENT INDEX may be implemented as a 5-bit signal. The signal COEFFICIENT TOKEN may be implemented as a 1-bit pulse. The control block 114 may iterate through all the coefficients in the current residual block based upon a coefficient token type. The residual block encoder 112 may be configured to output a CAVLC encoded version of the current residual block in response to the signal COEFFICIENT TOKEN.

Figure 3:
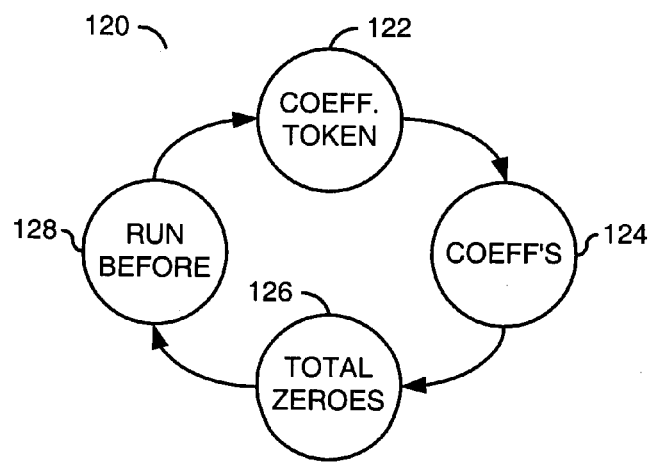
FIG. 3 is a state diagram illustrating a finite state machine (FSM) in accordance with the present invention.

Referring to FIG. 3, a state diagram is shown illustrating a finite state machine (FSM) 120 implemented in accordance with an embodiment of the present invention. In one example, the FSM 120 may be implemented as an H.264 syntax parsing finite state machine. The FSM 120 may be employed by the control module 114 of FIG. 2 to generate the signals COEFFICIENT INDEX and COEFFICIENT TOKEN.

In one example, the FSM 120 may implement a state 122, a state 124, a state 126 and a state 128. The state 122 may comprise a coefficient token state. The state 124 may comprise a coefficients state. The state 126 may comprise a total zero state. The state 128 may comprise a run before state. In one example, the FSM 120 may start in one of the states 122, 124, 126 or 128. The FSM 120 generally traverses from one state to the next (e.g., state 122 to state 124 to state 126 to state 128 to state 122).

During the state 122, a pulse of the signal COEFFICIENT TOKEN is sent to the residual block encoder 112 (as described above in connection with FIG. 2). During the state 124, the control block 114 drives the signal COEFFICIENT INDEX (as described above in connection with FIG. 2) and H.264 run before syntax elements are encoded with the coefficients. During the state 126, an H.264 total zeros syntax element may be output into the bitstream. During the state 128, the H.264 run before syntax elements encoded during the state 124 may be output into the bitstream in 1 cycle.

Figure 4:
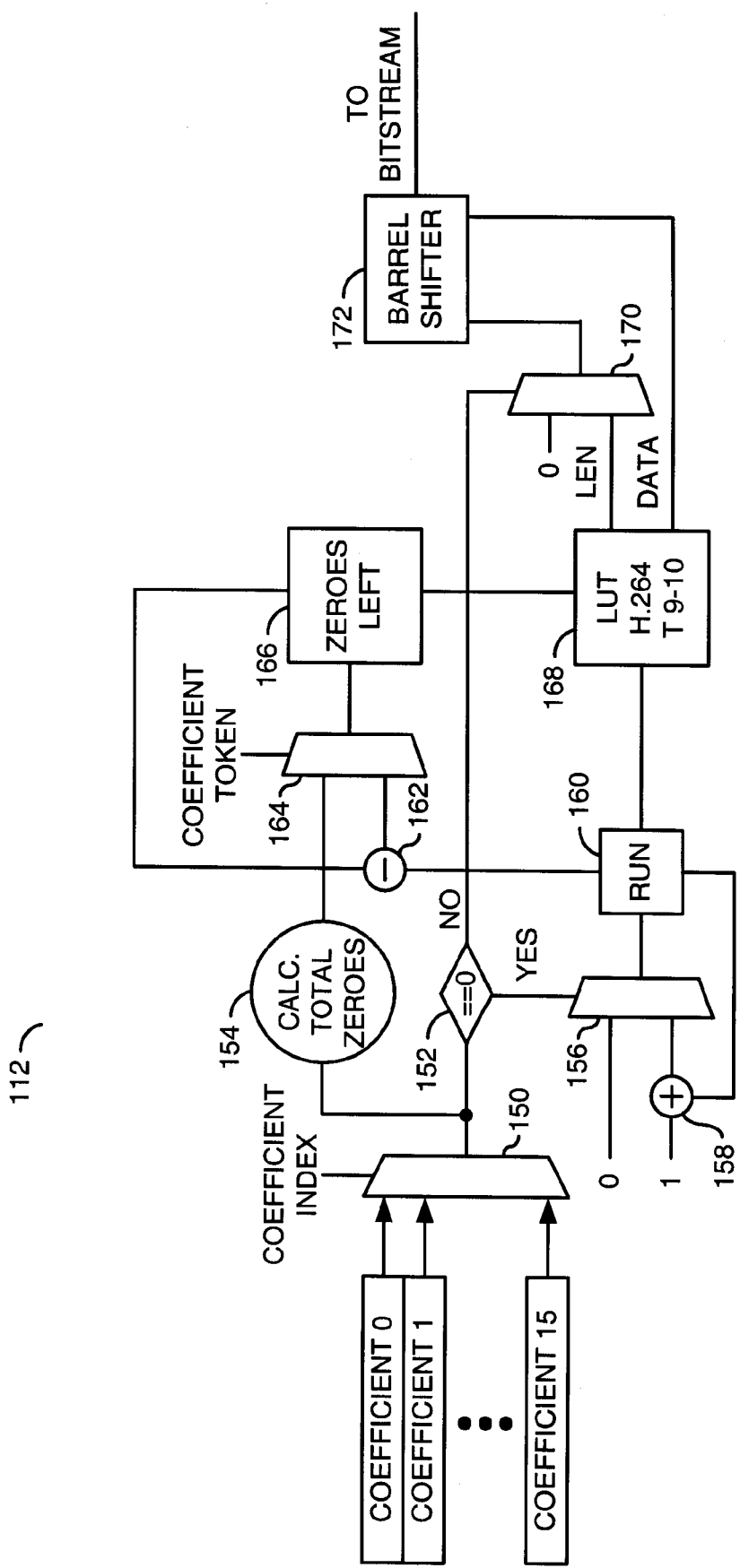
FIG. 4 is a diagram illustrating a residual block encoder in accordance with the present invention.

Referring to FIG. 4, a block diagram is shown illustrating an example of the residual block encoder 112 of FIG. 2 implemented in accordance with an embodiment of the present invention. The residual block encoder 112 may comprise, in one example, a block (or circuit) 150, a block (or circuit) 152, a block (or circuit) 154, a block (or circuit) 156, a block (or circuit) 158, a block (or circuit) 160, a block (or circuit) 162, a block (or circuit) 164, a block (or circuit) 166, a block (or circuit) 168, a block (or circuit) 170 and a block (or circuit) 172. The blocks 150, 156, 164 and 170 may be implemented, in one example, as multiplexer circuits. The block 152 may be implemented, in one example, as a comparator circuit. The block 154 may be implemented, in one example, as a total zeroes calculation circuit. The block 158 may be implemented, in one example, as an adder circuit. The block 160 may be implemented, in one example, as a run determining circuit. The block 162 may be implemented, in one example, as a subtractor circuit. The block 166 may be implemented, in one example, as a zeros left determining circuit. The block 168 may be implemented, in one example, as a look-up table (LUT). In one example, the block 168 may comprise a look-up table compliant with the H.264 standard (e.g., Tables 9 and 10). The block 172 may be implemented, in one example, as a barrel shifter.

The run block 160 and the zeros left block 166 may provide the inputs in accordance with Table 9-10 of the H.264 specification. The blocks 160 and 166 may be implemented, in one example, as counters. The block 166 (e.g., the zeros left counter) may be initialized with the total number of zeros in the residual block and decremented by the individual run values provided by the block 160 (e.g., the run counter). The run counter may be incremented for each zero coefficient encountered before the next non-zero coefficient, and then reset when that non-zero coefficient is encountered.

The block 150 may have a plurality of data inputs that may receive the linear array of quantized coefficients (QC). In one example, the linear array of quantized coefficients (QC) may be received in parallel. The block 150 may have a control input that may receive the signal COEFFICIENT INDEX. The block 150 may have an output that may present a signal to an input of the block 152 and an input of the block 154. The block 150 is generally configured to present one of the quantized coefficients in the linear array of quantized coefficients at the output based on the signal COEFFICIENT INDEX.

The block 152 may have a first output that may present a first control signal (e.g., YES) and a second output that may present a second control signal (e.g., NO). The signal YES may be asserted (e.g., set to a logic HIGH or "1") when the output of the block 150 has a value of zero. The signal NO may be asserted (e.g., set to a logic HIGH or "1") when the output of the block 150 has a value that is non-zero. The signal YES may be presented to a control input of the block 156. The signal NO may be presented to a control input of the block 170.

The block 156 may have a first data input that may be tied to a logic LOW (or "0") and a second data input that may receive an output of the adder 158. An output from the block 156 may be presented to an input of the block 160. The block 158 may have a first input that may be tied to a logic HIGH (or "1") and a second input that may receive a signal from a first output of the block 160. The block 160 may have a second output that may present a signal to a first input of the block 162 and a third output that may present a signal to a first input of the block 168.

The block 162 may have a second input that may receive a signal from a first output of the block 166 and an output that may present a signal to a first data input of the block 164. A second data input of the block 164 may receive an output of the block 154. The block 164 may have a control input that may receive the signal COEFFICIENT TOKEN. An output of the block 164 may be presented to an input of the block 166.

The block 166 may have a second output that may present a signal to a second input of the block 168.

Blocks 160, 166, and 154 may be implemented according to conventional techniques (e.g., the run before, zeros left, and total zeros values may be calculated using conventional techniques to produce a correct H.264 bitstream), however, the present invention changes when the values are calculated. The values are calculated during coefficient encoding such that a second indexation over all the coefficients is not necessary.

The block 168 may have a first output that may present a signal (e.g., LEN) to a first data input of the block 170 and a second output that may present a signal (e.g., DATA) to a first input of the block 172. The block 170 may have a second data input that may be tied to a logic LOW (or "0"). The block 170 may have an output that may present a signal to a second input of the block 172. The block 172 may have an output that may present the context adaptive variable length coding (CAVLC) encoded residual block to a bitstream. The residual block encoder 112 may be configured to output the contents of the barrel shifter 172 in response to the signal COEFFICIENT TOKEN.

The residual block encoder 112 may be configured, in one example, to achieve performance gains by employing, in parallel, a look-up table (LUT), a zeros left tracking circuit, and a barrel shifter. The residual block encoder 112 may be configured to shift in the run before syntax elements as they are encoded during coefficient encoding. For example, the run before syntax elements may be cumulatively encoded into the barrel shifter during coefficient encoding, providing an advantage over conventional techniques.

The present invention generally provides for simultaneous encoding of coefficient and run before syntax elements. Simultaneously encoding the run before syntax elements with the coefficients generally increases performance. In an alternative example, the present invention may provide a hardware (HW) implementation configured to re-iterate through the coefficients to encode the run before in sequential fashion. In one example, performance of the present invention may be illustrated by constructing a video source such that none of the samples transforms into a zero coefficient. For example, software may be used to set the quantization parameter (Qpy) to zero such that no quantization occurs. This is effectively the same as using Pulse Code Modulation (PCM) encoding. The video source may be fed into the input port of the encoder. The number of zero coefficients interspersed with non-zero coefficients may be varied in order to vary the run-befores. Performance may be evaluated by measuring the output bitrate. If the bitrate does not vary with run before variation, the encoder is operating in accordance with the present invention.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed)to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a control circuit configured to generate a first control signal and a second control signal; and
an encoder circuit configured to (i) receive a plurality of coefficients, the first control signal and the second control signal and (ii) generate an encoded signal in response to the plurality of coefficients, the first control signal and the second control signal, wherein said encoder circuit is further configured to simultaneously encode a run before syntax element into a barrel shifter during encoding of a corresponding coefficient of the plurality of coefficients.

2. The apparatus according to claim 1, wherein said plurality of coefficients comprises a linear array of quantized coefficients.

3. The apparatus according to claim 2, wherein the linear array of quantized coefficients are organized from a high frequency (AC) end to a low frequency (DC) end.

4. The apparatus according to claim 1, wherein said first control signal is configured to indicate which of the plurality of coefficients in a current residual block is being encoded and the second control signal is configured to indicate when a new residual block is present.

5. The apparatus according to claim 1, wherein the first control signal comprises a 5-bit signal and the second control signal comprises a 1-bit pulse.

6. The apparatus according to claim 1, wherein said control circuit further comprises a finite state machine (FSM) configured to generate said first control signal and said second control signal, wherein said FSM comprises a plurality of states including a coefficient token state, a coefficient state, a total zero state and a run before state.

7. The apparatus according to claim 1, further comprising a forward scan block configured to convert a 2D matrix of quantized coefficients into a linear array of quantized coefficients.

8. The apparatus according to claim 1, wherein said encoder circuit comprises:
a first multiplexer configured to select one of said plurality of coefficients in response to said first control signal;
a second multiplexer configured to update a run calculation in response to a value of the output of said first multiplexer;
a third multiplexer configured to update a number of zeros left in response to said second control signal; and
a fourth multiplexer configured to control said barrel shifter in response to the value of the output of said first multiplexer.

9. The apparatus according to claim 8, wherein said encoder circuit further comprises a look-up table configured to generate a data signal and a length signal in response to a run value and a zeroes left value.

10. The apparatus according to claim 1, wherein said encoder circuit is compliant with H.264 standard.

11. The apparatus according to claim 1, wherein said encoder circuit comprises a residual block encoder.

12. A residual block encoder comprising:
means for generating a first control signal and a second control signal; and
means for generating an encoded signal in response to a plurality of quantized coefficients, the first control signal and the second control signal, wherein a run before syntax element is simultaneously encoded into a barrel shifter during encoding of a corresponding quantized coefficient of the plurality of quantized coefficients.

13. A method for encoding run before syntax elements with zero cycle costs comprising the steps of:
generating a first control signal and a second control signal; and generating an encoded signal in response to a plurality of coefficients, the first control signal and the second control signal, wherein a run before syntax element is simultaneously encoded into a barrel shifter during encoding of a corresponding coefficient of the plurality of coefficients.

14. The method according to claim 13, wherein said plurality of coefficients comprises a linear array of quantized coefficients.

15. The method according to claim 14, wherein the linear array of quantized coefficients is arranged from a high frequency (AC) coefficient to a low frequency (DC) coefficient.

16. The method according to claim 13, wherein said first control signal and said second control signal are generated using a finite state machine (FSM) comprising a plurality of states including a coefficient token state, a coefficient index state, a total zero state and a run before state.

17. The method according to claim 13, further comprising converting a two dimensional (2D) matrix of quantized coefficients into a linear array of quantized coefficients.

18. The method according to claim 13, wherein generating said encoded signal comprises:
selecting one of said plurality of coefficients in response to said first control signal;
updating a run calculation based on a value of the coefficient selected;
updating a number of zeros left in response to said second control signal; and
controlling said barrel shifter in response to said value of the coefficient selected.

19. The method according to claim 18, further comprising generating a data signal and a length signal in response to a run value and a zeroes left value.

20. The method according to claim 19, wherein said data signal and said length signal are generated using a look-up table (LUT) compliant with H.264 video standard.

* * * * *